United States Patent
Manga et al.

(10) Patent No.: US 12,476,266 B2
(45) Date of Patent: Nov. 18, 2025

(54) METHOD FOR FUELING FUEL CELL SYSTEMS, AND FUEL CELL SYSTEM ASSEMBLY

(71) Applicant: Robert Bosch GmbH, Stuttgart (DE)

(72) Inventors: Bilge Manga, Leonberg (DE);
Christian Krause, Stuttgart (DE);
Stephan Olbrich, Stuttgart (DE);
Stephan Strahl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 17/928,030

(22) PCT Filed: Apr. 14, 2021

(86) PCT No.: PCT/EP2021/059624
§ 371 (c)(1),
(2) Date: Nov. 28, 2022

(87) PCT Pub. No.: WO2021/239315
PCT Pub. Date: Dec. 2, 2021

(65) Prior Publication Data
US 2023/0216070 A1    Jul. 6, 2023

(30) Foreign Application Priority Data
May 28, 2020    (DE) .................. 10 2020 206 698.1

(51) Int. Cl.
*H01M 8/04082*    (2016.01)
*H01M 8/043*    (2016.01)
(Continued)

(52) U.S. Cl.
CPC ....... *H01M 8/04201* (2013.01); *H01M 8/043* (2016.02); *H01M 8/04303* (2016.02);
(Continued)

(58) Field of Classification Search
None
See application file for complete search history.

(56) References Cited

U.S. PATENT DOCUMENTS 6,964,821 B2    11/2005   Hirakata
2008/0241643 A1*  10/2008  Lepp .............. H01M 8/04753
                                                    429/61
(Continued)

FOREIGN PATENT DOCUMENTS

DE         10028331 C2    11/2002
DE      102010027881 A1   10/2011
(Continued)

OTHER PUBLICATIONS

Translation of International Search Report for Application No. PCT/EP2021/059624 dated Jun. 29, 2021 (2 pages).

*Primary Examiner* — Jonathan Crepeau
(74) *Attorney, Agent, or Firm* — Michael Best & Friedrich LLP

(57) ABSTRACT

The invention relates to a method for fueling fuel cell systems (Sys A, Sys B) which are operated in an assembly (10) of a plurality of fuel cell systems (Sys A, Sys B), and to a fuel cell system assembly (10). According to the invention, a method is provided by means of which a load (100) operated by the assembly (10) can continue to be operated while a fueling process is carried out by a fueling device 20 assigned to the fuel cells (FC 1, FC 2) of the fuel cell system (Sys A, Sys B).

11 Claims, 2 Drawing Sheets

(51) Int. Cl.
  *H01M 8/04303*   (2016.01)
  *H01M 8/04313*   (2016.01)
  *H01M 8/0444*    (2016.01)
  *H01M 8/04746*   (2016.01)
  *H01M 8/04955*   (2016.01)

(52) U.S. Cl.
  CPC ..... *H01M 8/04313* (2013.01); *H01M 8/0444* (2013.01); *H01M 8/04753* (2013.01); *H01M 8/04955* (2013.01)

(56) References Cited

U.S. PATENT DOCUMENTS

2012/0009494 A1\* 1/2012 Chou ................. H01M 16/006
                                                        429/430
2020/0280080 A1\* 9/2020 Yokoyama ........ H01M 8/04753

FOREIGN PATENT DOCUMENTS

DE   102017214975 A1       2/2019
JP       2016081724    \*  5/2016
JP       2018014177    \*  1/2018

\* cited by examiner

METHOD FOR FUELING FUEL CELL SYSTEMS, AND FUEL CELL SYSTEM ASSEMBLY

BACKGROUND OF THE INVENTION

The present invention relates to a method for refueling fuel cell systems that are operated in an assembly of multiple fuel cell systems, by means of which assembly at least one load is supplied with electrical power, a fuel cell system having in each case at least one fuel cell, with multiple tank devices by means of which fuel is fed to the fuel cells, each of the tank devices being assignable or assigned to at least one of the fuel cells, and with a control device by means of which the operation of fuel cells and tank devices is monitored and controlled. The invention also relates to a fuel cell system assembly that is provided with multiple fuel cell systems, each with at least one fuel cell, and is configured to supply energy to at least one load.

Fuel cells or fuel cell systems have nowadays become widely used. In the automotive sector, this applies to the drives of vehicles and to various superstructures that require electrical power, for example for cooling goods.

In a fuel cell, electrical current is generated by chemical reaction. Here, a fuel and an oxidant are converted into electrical energy and water as reaction products. Here, a fuel cell is composed substantially of an anode part, a membrane and a cathode part. The electrons that are released in the chemical reaction can be conducted as electrical current through a consumer, for example the electric motor of an automobile.

Such fuel cell systems are known for example from DE10028331C2.

Fuel cells or fuel cell systems may also be used in other technical fields, for example in server farms inter alia for the power thereof or equally for cooling applications, for example for auxiliary assemblies of cruise ships or container ships in the shipping industry.

Considering fuel cell systems that are used in vehicles, for example, it is necessary to deactivate the system during refueling for safety reasons. This means that no electrical power may or can be output by the fuel cell systems during a refueling operation. Since, during the refueling operation, it is however even sought to ensure that the fuel cell system is supplied with electrical power in order to provide the required functionalities (for example monitoring of the $H_2$ concentration within the system) during refueling, use is generally made of a battery which is present in the vehicle, and which is possibly even provided specifically for this purpose within the vehicle. In other refinements, a supply may also be ensured from the refueling station itself, for example. Here, both variants mentioned increase the expenditure on supply facilities that must be provided, and on the administration and maintenance thereof.

SUMMARY OF THE INVENTION

The invention advantageously yields a method for refueling fuel cell systems, and an assembly of fuel cell systems, with which the refueling of tank devices assigned to the fuel cells for the supply of the respective fuels can be carried out with less expenditure, and uninterrupted operation of the loads that are operated using the fuel cell systems can at the same time be ensured.

The concept on which the present invention is based consequently consists in that, in a method of the type mentioned in the introduction, the following steps are carried out:
a) identifying the need for refueling at least one of the tank devices on the basis of a sensor signal or a predetermined value of a parameter by means of the control device;
b) isolating the power output of the fuel cell system comprising the fuel cell(s) to which the tank device for refueling is assigned from the assembly of fuel cell systems;
c) refueling the respective tank device in question, operating the load using the remaining assembly of fuel cell systems;
d) ending the refueling operation at the tank device in question;
e) reconnecting the previously separated fuel cell system to the fuel cell system assembly.

Correspondingly, in the method according to the invention, it is firstly the case that, during ongoing operation, that is to say during the operation of the at least one load, the tank devices assigned to the fuel cell systems are for example continuously interrogated with regard to their fill level, or a corresponding continuously updated sensor signal from at least one sensor is permanently available. If a consumption of the respective load is known and continuously constant, the need for refueling of a tank device may also result simply from the expiry of a certain period of time. Based on the parameters provided to it, the control device is capable of identifying the need for a refueling operation. This may also result for example from a situation in which a relatively long period of operation is planned for the load to which a supply is to be provided, which means that an interim refueling operation is prohibited or rendered unlikely. In a subsequent step, the power output of that fuel cell system which has fuel cells to which fuel is to be supplied by the tank device for refueling, that is to say to which the tank device for refueling is assigned, is isolated from the assembly of fuel cell systems. Here, the fuel cell system question may, in a known manner, have at least one fuel cell or multiple fuel cells. What is important here is the isolation of the respective fuel cell system with one or more fuel cells from the power output of the assembly, though it is also conceivable, for example owing to the existence of corresponding safety requirements, for respective fuel cell systems to be deactivated entirely for the refueling operation.

In the next step, the tank device in question, which is assigned to the fuel cell system that is isolated from the outputting of power to the load, or which is assigned to the fuel cells of said fuel cell system, is refueled, wherein the operation of the load is continued, that is to say electrical energy (power) continues to be supplied to the load, using the remaining assembly of fuel cells.

After the ending of the refueling operation of the respective tank device, the fuel cell system that has been isolated from the assembly of fuel cell systems is connected to said assembly again in a further step.

Advantageous refinements and improvements of the invention can be found in the subclaims.

One advantageous variant of the method according to the invention for permanently ensuring adequately refueled tank devices may consist in a method step in which the method steps listed above are carried out again under the condition that the need for refueling of one of the tank devices is identified again in the first of said steps. This may in principle be any of the tank devices of the assembly of fuel cell systems. The control device thus advantageously continuously interrogates whether one of the tank devices requires a refueling operation, such that necessary measures can be initiated in good time by the system. This may for example have the effect that all tank devices of the assembly of fuel cell systems are automatically refueled in succession, or several tank devices can be refueled simultaneously in a specified pattern or schedule or even in an arbitrary cumulative manner, as long as the required power output is ensured.

In a preferred refinement of the method according to the invention, electrical power is continuously generated and provided the at least one load by the assembly of fuel cell systems whilst the method steps mentioned above are carried out, such that uninterrupted continuous operation of said load is possible.

In another advantageous variant of the method according to the invention, which is independent of any external energy sources that may be provided, electrical power provided by the assembly of fuel cell systems during the refueling operation can be supplied inter alia to functional devices of the fuel cell system assigned to the tank device being refueled, and/or supplied to a refueling station. The functionalities that must be covered by the functional devices mentioned may for example involve the monitoring of the H2 concentration within the respective fuel cell system, such that the battery that is otherwise provided for this purpose can be omitted. Further electrically operated functional devices, in principle any further electrically operated functional devices, are also conceivable. Moreover, it is furthermore also possible for the respective refueling station that feeds fuel to the one or more tank devices to be supplied/operated with the electrical power provided.

A permanent supply of electrical power is ensured with a further advantageous variant of the method according to the invention in which at least one fuel cell system is not refueled during the refueling of tank devices. Here, it may be an object of the control device to monitor the assembly of fuel cell systems such that there is a permanent power output from at least one fuel cell system of the assembly of fuel cell systems, in order to thereby ensure a permanent supply of electricity.

The invention likewise also yields an assembly of fuel cell systems of the type mentioned in the introduction, in which the control device, in order to refuel at least one of the tank devices, (electrically) isolates those fuel cell systems which are assigned to said tank device from the assembly of fuel cell systems and optionally deactivates said fuel cell systems, whilst at least a proportion of the other fuel cell systems, as a remaining assembly, supplies adequate electrical power to the load.

In one advantageous refinement of the assembly of fuel cell systems according to the invention, a tank device is assigned to in each case one fuel cell system composed of at least two fuel cells. Although the respective fuel cell systems may in principle be provided and configured with only one fuel cell, it is expedient, for the purposes of increased fail-safety, to provide at least two fuel cells for this purpose.

A preferred embodiment of the assembly according to the invention of fuel cell systems may be provided and configured such that each of the tank devices is assigned the same number of fuel cells. In this way, it is for example possible for a fuel cell system to be configured with two fuel cells, to which one tank device is commonly assigned, whilst the assembly is constructed from multiple these specific fuel cell systems. Configuring the assembly with multiple, in each case identical fuel cell systems promotes the scalability of said assembly, which in turn can also increase the fail-safety of the overall system (assembly).

In one particularly preferred embodiment of the assembly of fuel cell systems according to the invention, said assembly may be provided and configured such that, independently of the respective intended use, just one of the fuel cell systems of the assembly of fuel cell systems is sufficient to provide an adequate supply to the load. This refinement yields high fail-safety, paired with the possibility of simultaneously refueling all of the other tank devices that are not assigned to the fuel cells of said fuel cell system.

In a further advantageous embodiment of the assembly of fuel cells, said assembly is provided and configured to have a sensor device which detects and signals at least one fill level, at least one concentration, the isolation of a fuel cell system from the assembly or the deactivation of said fuel cell system, or at least the presence of a refueling situation of a tank device. The sensor device, which is generally assigned to the control device, is thus provided substantially for providing the control device with information that could be of relevance for the refueling operation of at least one of the tank devices. As mentioned, this may on the one hand be information relating to a fill level or concentration, which may be of significance with regard to identifying the need for refueling or with regard to safety aspects. On the other hand, the information may be linked to the refueling operation of at least one of the tank devices, for example may relate to whether the tank device in question has been correctly isolated from the assembly of fuel cell systems, or whether a refueling operation is presently taking place or has ended. This may be of importance for example for the purposes of efficiently refueling all of the tank devices of the assembly of fuel cell systems.

With the method described above, and the assembly of fuel cell systems according to the invention, it is thus possible, with less expenditure, to supply the respective fuels to the tank devices assigned to the fuel cells, and at the same time to ensure uninterrupted operation of the loads that are operated using the fuel cell systems.

BRIEF DESCRIPTION OF THE DRAWINGS

The invention will be discussed in more detail below on the basis of exemplary embodiments and with reference to the appended figures of the drawing, in which, in part in a highly schematic illustration.

DETAILED DESCRIPTION

In the figures, the same reference designations are used to denote identical or functionally identical components unless stated otherwise.

Figure 1:
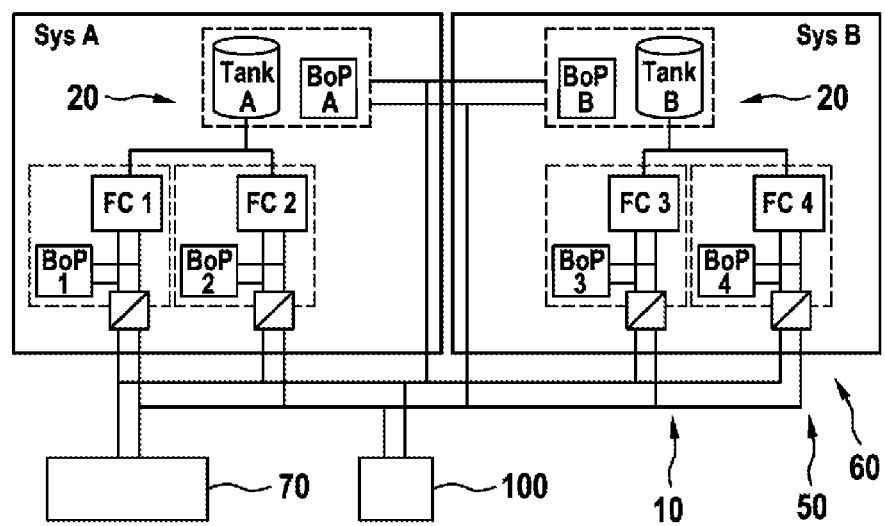
FIG. 1 shows a diagram of an assembly of fuel cell systems with fuel cells and tank devices assigned thereto.

FIG. 1 shows an exemplary embodiment according to the invention of an assembly, denoted as a whole by 10, of fuel cell systems Sys A, Sys B, the two fuel cell systems Sys A, Sys B that are shown being arranged adjacent to one another but spaced apart from one another. Here, each of the two fuel cell systems Sys A, Sys B is assigned a respective tank device 20, each with one tank y with assigned consumers BoP y (y=A, B), which tanks in turn supply fuel to the fuel cells FC x which are assigned to said tanks and which have assigned consumers BoP x (x=1, 2, 3, 4). The consumers BoP x may for example be functional devices of the fuel cell to which said consumers are respectively assigned. It can be clearly seen here that each fuel cell system Sys A, Sys B is assigned in each case two fuel cells FC x, to which a supply is provided from the same tank device 20 in each case, that is to say, for example, a supply is provided to FC 1 and FC 2 by the tank device 20 with tank A and to FC 3 and FC 4 by the tank device 20 with tank B. In this configuration, it is accordingly possible that, when a fuel cell system Sys A, Sys B for refueling is isolated from the assembly 10, the respective other fuel cell system Sys B, Sys A, as a remaining assembly 10, individually takes over the provision of an adequate supply to the load 100 whilst the fuel cell system Sys A, Sys B being refueled is isolated from the outputting of power to the load 100. FIG. 1 thus shows the fuel cell systems FC x with the respective consumers BoP x and the tank devices 20 with the respective tank y with their respective consumers BoP y. If it is the intention to refuel the tank device 20 with tank A, the fuel cell system Sys A can be isolated and/or deactivated. FC 1 and FC 2 can thus then be deactivated. During the refueling of the fuel cell system Sys A, the fuel cell system Sys B can, as a remaining, non-isolated part of the assembly 10 of fuel cell systems Sys A, Sys B, continue to provide power to the load 100.

Finally, FIG. 1 also shows a high-voltage battery 70 that can be used for the operation of the consumers BoP x of the respectively isolated fuel cell system Sys A, Sys B with optionally deactivated fuel cells FC x. Said battery 70 may however also be omitted, because the required power is provided by the respective other, non-isolated fuel cell system B, A.

Figure 2:
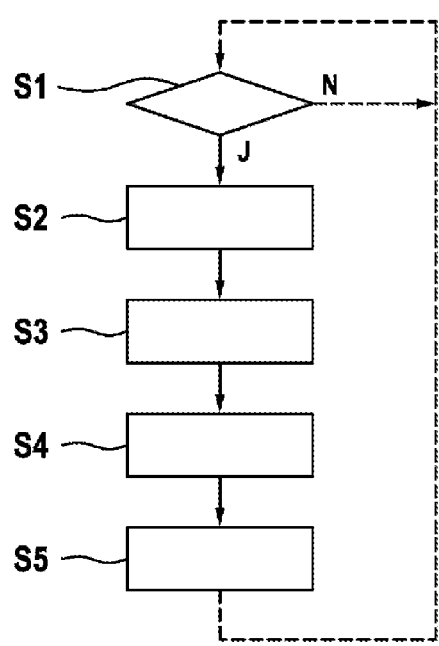
FIG. 2 shows a diagram with method steps for carrying out the method according to the invention.

FIG. 2 shows a diagram illustrating the method according to the invention for refueling fuel cell systems Sys A, Sys B that are operated in an assembly 10 of multiple fuel cell systems Sys A, Sys B, which assembly 10 is used to supply electrical energy to at least one load 100. Here, in a step S1, the need for refueling of at least one of the tank devices 20 is identified on the basis of a sensor signal, or of a predetermined value of a parameter, by the control device 50 (not shown in any more detail). In a step S2, that fuel cell system A of the assembly 10 of fuel cell systems Sys A, Sys B which comprises the fuel cells FC 1, FC 2 to which the tank device 20 for refueling, with the respective tank A, is assigned is isolated from the outputting of power; in a step S3, the respective tank device 20 is refueled, with the load 100 being operated using the fuel cell system Sys B as a remaining assembly 10 of fuel cell systems; in a step S4, the refueling operation of the respective tank device 20 is ended, following which, in a step S5, the previously isolated fuel cell system Sys A is connected to the fuel cell system assembly 10 again. The dashed lines indicate that, after the completion of step S5, the process of identifying the need for refueling is commenced again. This applies equally in the event that, in S1, the need is determined not to be present.

Figure 3:
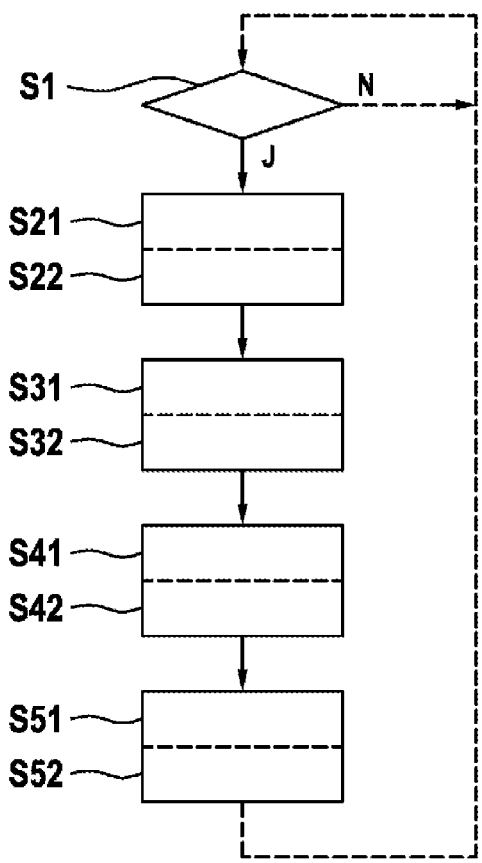
FIG. 3 shows a diagram illustrating a refueling operation of a tank device from FIG. 1 as part of the method from FIG. 2.

FIG. 3 shows a schematic diagram illustrating, in more detail, the steps S2 to S5 from FIG. 2 for an assembly of fuel cells from FIG. 1 in a variant in which all tank devices are refueled successively. For example, continuous sampling can be performed by means of the sensor device 60 (not illustrated in any more detail in the figures of the drawing) together with the control device 50 (likewise not illustrated in any more detail) and, as a result of step S1, it can be signaled that the tank device 20 with the tank A is to be refueled first (as a result of step S1 in FIG. 2). In step S21, the power output of the fuel cell system A is isolated from the assembly 10, and the fuel cells FC 1 and FC 2 are deactivated in a step S22. In a step S31, the provision of a supply to the load 100 is ensured by virtue of power being output by the further fuel cell system B of the assembly 10, following which, in a step S32, the refueling is performed by virtue of a connection of the tank A to a refueling station facility (not illustrated) being opened up.

After the ending of the refueling operation in step S41, in step S42, the previously opened-up connection to the tank A is shut off again such that, in step S51, the fuel cells FC 1 and FC 2 are then firstly activated again if necessary in order for the fuel cell system Sys A to be connected to the assembly 10 of fuel cell systems Sys A, Sys B again in step S52. If it is necessary for the tank Sys B of the tank device 20 of the fuel cell system B to also be refueled, the same process takes place with the respective other devices of the assembly 10.

Thus, if multiple fuel cell systems Sys A, Sys B are operated in the assembly 10, then continuous operation is possible during the refueling of one of the fuel cell systems Sys A, Sys B, which is part of the assembly 10, for example with hydrogen, and electrical power is continuously generated. A battery can thus be omitted during the refueling operation. It is even possible for the refueling station itself to be supplied with electrical power. In the examples mentioned in the introduction, the continuous generation of power, and the continuous operation of the load in question that is thus made possible, can mean that, in the case of a vehicle, said vehicle can continue to travel during the refueling operation, that the superstructures of a vehicle (for example cooling of goods) can continue to be operated, that, in the case of server farms to which a supply is provided by fuel cell systems, an assembly of fuel cell systems can ensure fail-safety during the refueling operation, and that cruise ships or container ships in port can continue to be operated during the refueling operation.

Although the present invention has been described here with reference to preferred exemplary embodiments, it is not restricted to these, and may be modified in a wide variety of ways.

The invention claimed is:

1. A method for refueling fuel cell systems (Sys A, Sys B) that are operated in an assembly (10) of multiple fuel cell systems (Sys A, Sys B), by means of which assembly (10) at least one load (100) is supplied with electrical power, a fuel cell system (Sys A, Sys B) having in each case at least one fuel cell (FC x), with multiple tank devices (20) by means of which fuel is fed to the fuel cells (FC x), each of the tank devices (20) being assignable or assigned to at least one of the fuel cells (FC x), and with a control device (50) by means of which the operation of fuel cells (FC x) and tank devices (20) is monitored and controlled, the method comprising:
   a) identifying the need for refueling at least one of the tank devices (20) on the basis of a sensor signal or a predetermined value of a parameter by means of the control device (50) (S1);
   b) isolating the power output of the fuel cell system (Sys A, Sys B) comprising the fuel cell(s) (FC x) to which the tank device (20) for refueling is assigned (S2) from the assembly (10) of fuel cell systems (Sys A, Sys B);
   c) refueling the respective tank device (20) in question, and operating the load (100) using the remaining assembly (10) of fuel cell systems (Sys A, Sys B) (S3);
   d) ending the refueling operation at the tank device (20) in question (S4);

e) reconnecting the previously separated fuel cell system (Sys A, Sys B) to the fuel cell system assembly (10) (S5).

2. The method as claimed in claim 1, further comprising:
f) carrying out steps a) to e) again if, upon carrying out step a) again, the need for refueling of a further tank device (20) is identified.

3. The method as claimed in claim 1, wherein electrical power is continuously generated and provided by the assembly (10) of fuel cell systems (Sys A, Sys B) whilst steps a)-e) are carried out.

4. The method as claimed in claim 1, wherein electrical power provided by the assembly (10) of fuel cell systems (Sys A, Sys B) during the refueling operation is supplied inter alia to functional devices (BoP x) of the fuel cell system (Sys A, Sys B) assigned to the tank device (20) being refueled, and/or to a refueling station.

5. The method as claimed in claim 1, wherein at least one fuel cell system (Sys A, Sys B) is not refueled during the refueling of tank devices (20).

6. A fuel cell system assembly (10) that is provided with multiple fuel cell systems (Sys A, Sys B), each with at least one fuel cell (FC x), and is configured to supply electrical power to at least one load (100), with multiple tank devices (20) which feed fuel to the fuel cells (FC x), each of the tank devices (20) being assignable or assigned to at least one of the fuel cells (FC x), and with a control device (50) that monitors and controls the operation of the fuel cell systems (Sys A, Sys B) and tank devices (20), the control device (50), in order to refuel at least one of the tank devices (20), electrically isolating those fuel cells (FC x) of the fuel cell system (Sys A, Sys B) in question which are assigned to said tank device from the assembly (10) of fuel cell systems (Sys A, Sys B) and optionally deactivating said fuel cells, whilst at least a proportion of the other fuel cell systems (Sys A, Sys B), as a remaining assembly, supplies adequate electrical power to the load.

7. The fuel cell system assembly (10) as claimed in claim 6, wherein a tank device (20) is assigned to in each case one fuel cell system (Sys A, Sys B) composed of at least two fuel cells (FC x).

8. The fuel cell system assembly (10) as claimed in claim 6, each of the tank devices (20) being assigned to the same number of fuel cells (FC x).

9. The fuel cell system assembly (10) as claimed in claim 6, each of the fuel cell systems (Sys A, Sys B) of the fuel cell system assembly (10) being provided and configured to be individually sufficient to provide an adequate supply to the load (100).

10. The fuel cell system assembly (10) as claimed in claim 6, said fuel cell system assembly being provided and configured to have a sensor device (60) which detects and signals at least one fill level, at least one concentration, the isolation of a fuel cell system (Sys A, Sys B) from the assembly (10) or the deactivation of said fuel cell system, or at least the presence of a refueling situation of a tank device (20).

11. The method as claimed in claim 2, wherein electrical power is continuously generated and provided by the assembly (10) of fuel cell systems (Sys A, Sys B) whilst steps a)-f) are carried out.

* * * * *